United States Patent
Plattner et al.

(10) Patent No.: US 6,772,750 B2
(45) Date of Patent: Aug. 10, 2004

(54) CABLE SAW

(75) Inventors: Josef Plattner, Gallzein (AT); Hans-Jörg Rieger, Thüringen (AT)

(73) Assignee: Hilti Aktiengesellschaft, Schaan (LI)

( * ) Notice: Subject to any disclaimer, the term of this patent is extended or adjusted under 35 U.S.C. 154(b) by 1 day.

(21) Appl. No.: 10/260,880

(22) Filed: Sep. 30, 2002

(65) Prior Publication Data

US 2003/0079733 A1 May 1, 2003

(30) Foreign Application Priority Data

Oct. 1, 2001 (DE) .......................... 101 48 492

(51) Int. Cl.⁷ ........................... B28D 1/08; B26D 1/44
(52) U.S. Cl. ........................ 125/21; 83/651.1; 83/809
(58) Field of Search .................. 125/21; 83/651.1, 83/661, 611, 809

(56) References Cited

U.S. PATENT DOCUMENTS

| 4,765,307 A | | 8/1988 | Kubo | |
|---|---|---|---|---|
| 4,893,607 A | * | 1/1990 | Kubo | 125/21 |
| 5,060,628 A | * | 10/1991 | Ishida | 125/21 |
| 5,645,040 A | * | 7/1997 | Bieri jun. | 125/21 |
| 5,875,771 A | | 3/1999 | Plattner | |
| 6,510,774 B1 | * | 1/2003 | Steiner | 83/200.1 |
| 6,513,513 B1 | * | 2/2003 | Steiner | 125/16.02 |

FOREIGN PATENT DOCUMENTS

| DE | 3718281 | * | 3/1989 |
|---|---|---|---|
| DE | WO 00/12250 | * | 3/2000 |
| WO | 9518692 | | 7/1995 |

OTHER PUBLICATIONS

Patent Abstract of Japan, JP–10 19331, Jul. 1998.

* cited by examiner

Primary Examiner—Maurina T Rachuba
(74) Attorney, Agent, or Firm—Sidley Austin Brown & Wood, LLP

(57) ABSTRACT

A device for deflecting a saw cable (13) of a cable saw and having a support (1) and at least one deflection member (2) securable to the support (1) and having two support arms (6), between which a deflection roller (3) is rotatably supported, and two guide surfaces (18) formed in the region of the deflection member (2) projecting beyond the deflection roller (3) for preventing the saw cable (13) from falling off of the deflection roller (3).

9 Claims, 2 Drawing Sheets

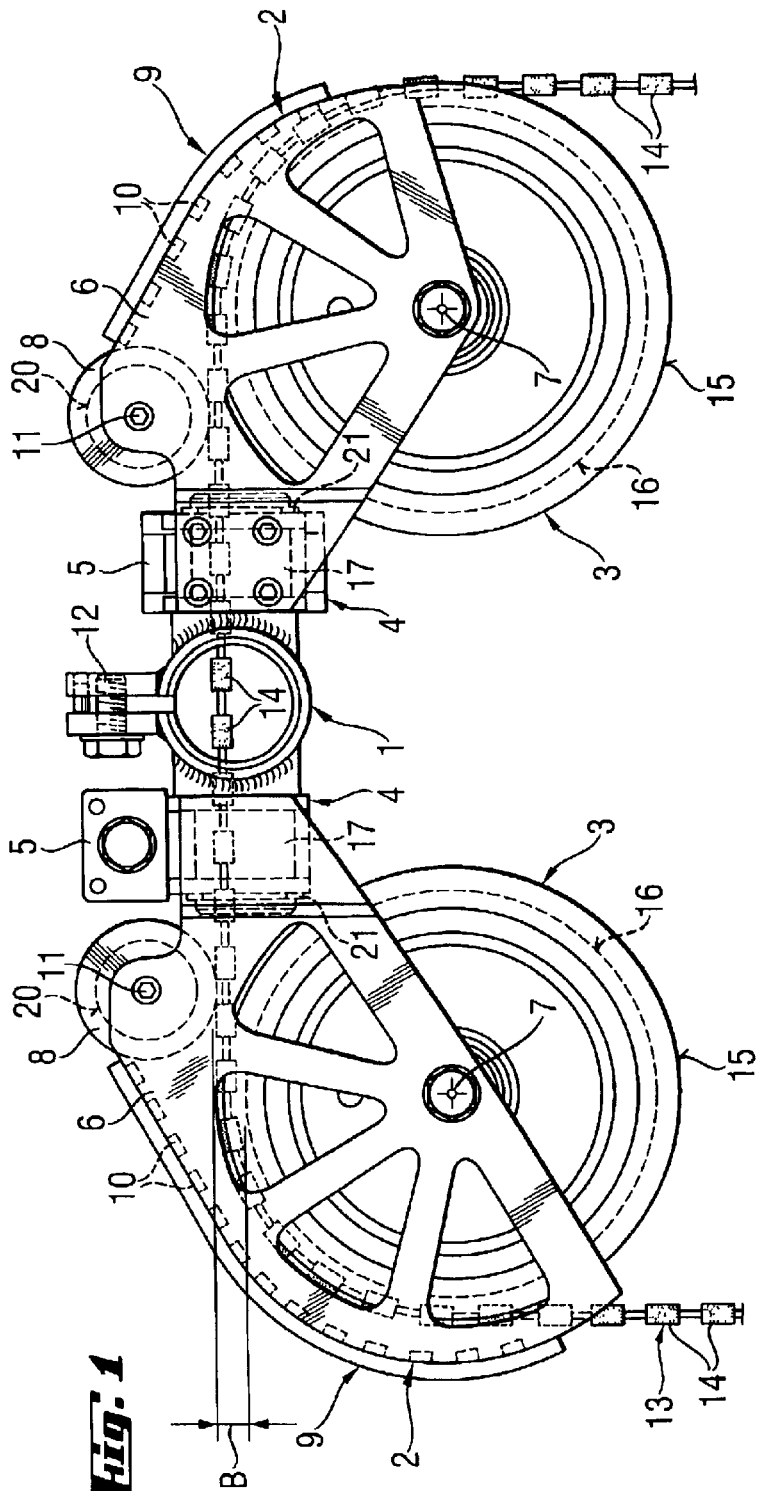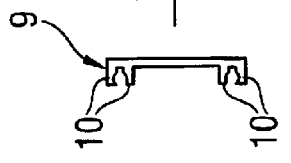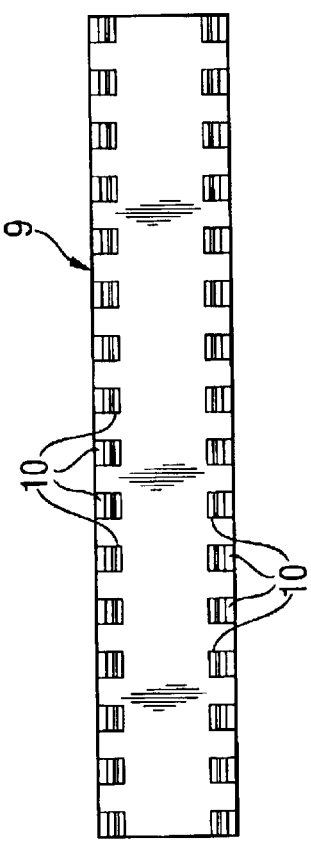

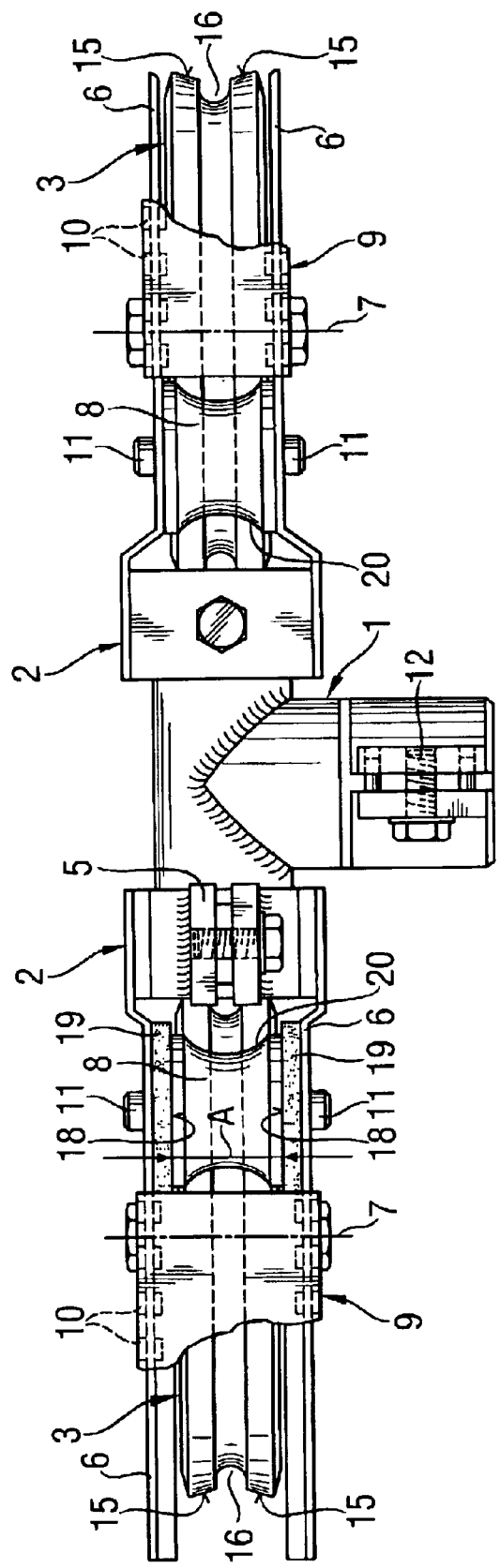

CABLE SAW

BACKGROUND OF THE INVENTION

1. Field of the Invention

The present invention relates to a device for deflecting a saw cable of a cable saw and including a support through which the saw cable is extendable, at least one deflection member securable to the support without a possibility of rotation relative thereto and including a receiving region connectable with the support and two support arm extending parallel to each other, and a deflection roller rotatably supported between the two support arms and having, in its outer circumferential profile, a circumferential groove a cross-section of which corresponds to a cross-section of the saw cable.

2. Description of the Prior Art

For cutting stone, concrete, steel concrete and the like constructional material, cable saw machines are used. The cable saw machine cuts the to-be-cut material by displacing a saw cable, which is provided with diamond segments. For deflecting the saw cable in different directions, at least one deflecting device is used, e.g., such as disclosed in U.S. Pat. No. 5,875,771.

U.S. Pat. No. 5,875,771 discloses a deflection device having a support and two deflection members secured to the support without a possibility of rotation relative to the support. Each deflection member includes two, extending substantially parallel to each other, support arms and a deflection roller arranged between the two arms and mounted on a rotating axle extending through the two arms. The roller has a groove which is formed in its outer circumferential profile and cross-section of which substantially corresponds to the cross-section of the saw cable. The saw cable extends from one deflection roller through the support and to another deflection roller.

During cutting with a cable saw machine, because of the variation of the cutting force and vibrations of the saw cable, the saw cable can spring off of the groove into a free space between the deflection roller and inner sides of the deflection roller-supporting support arms. If the displacement of the saw cable is not immediately noticed, i.e., the saw machine is not immediately brought to a standstill, the saw cable would cut through the parts of the saw machine itself During an operation in which the sight of separate deflection rollers is blocked from a user, e.g., during the use of a submerged cable saw, this problem cannot be eliminated even when the saw machine is operated by a very attentive user.

Accordingly, an object of the present invention is to provide a simple and economical in manufacture device for deflecting a saw cable of a cable saw machine, further a cable saw, which would insure both rapid and reliable displacement of the saw cable relative to the support without the saw cable being able to spring off of the deflection roller even when the saw cable is subjected to vibrations.

SUMMARY OF THE INVENTION

This and other objects of the present invention, which will become apparent hereinafter, are achieved by providing a device a deflection member of which has, in its region projecting beyond the outer profile of the deflection roller, facing each other and extending perpendicular to a rotational axis of the deflection roller, guide surfaces spaced from each other by a distance greater than the cross-section of the saw cable and corresponding at most substantially to a width of the deflection roller measured parallel to its rotational axis.

In the device according to the present invention, the two guide surfaces formed by the support arms insure that the saw cable always remains in the region of the circumferential outer profile of the deflection roller despite the tendency to spring off of the deflection roller even when the saw cable is subjected to vibrations. During the restoration of the saw cable tension and because of the specially formed outer circumferential profile of the deflection roller, the diameter of which becomes reduced toward the groove, the saw cable automatically returns into the groove. The deflection roller has, e.g., a rigid disc-shaped body. The circumferential region with the groove, however, can be formed, e.g., of an elastic material. As an elastic material, e.g., rubber can be used that is vulcanized over the metal body.

In order to insure proper guidance of the saw cable over the deflection roller, the guide surfaces, preferably, extend over from 25% to 100% of the circumference of the deflection roller.

The damage of the support arms by the saw cable is preferably prevented by forming the guide surfaces as replaceable wearable elements securable to the support arms. The advantage of forming the guide surfaces of replaceable elements consists in that the distance between the two guide surfaces can be changed by forming the replaceable elements with a different thickness. The replaceable elements can be formed alternatively of wear-resistant or slightly wearable material.

Because of alternating bending stresses to which the saw cable is subjected, rupture of the saw cable can take place. The rupture primarily results from a shock load in the region of the support members through which the saw cable extends. As a result, the saw cable becomes buckled in this area, and many meters of the saw cable become unusable. To prevent the action of shock loads on the saw cable, advantageously, a protective roller for the saw cable is rotatably arranged between the deflection roller and the receiving region of the deflection member and between the guide surfaces, with the rotational axis of the protective roller extending parallel to the rotational axis of the deflection roller.

In order to prevent the saw cable from springing off of the groove of the deflection roller upon alternating bending stresses being applied to the saw cable, advantageously, a distance between the deflection roller and the impact protective roller measured transverse to the rotational axis of the deflection roller substantially corresponds to the cross-section of the saw cable.

The centering of the protective roller with respect to the saw cable is insured by providing a circumferential indentation in the outer circumferential profile of the protective roller.

The diamond segments are formed of diamonds and a matrix material, both being sensitive to impacts. To prevent damage of the diamond segments when the saw cable vibrates and strikes the protective roller, at least a circumferential end region of the impact protective roller is formed of a resilient material. As a resilient material, e.g., rubber or a plastic material can be used.

In case when the cable saw machine operates with the use of cooling water, the working environment is very contaminated because high linear speeds (about 27 m/sec) and water cause the contamination, in particular in areas where the saw cable is deflected. The contamination of adjacent surfaces is prevented by providing a guard at least partially covering the circumference of the deflection roller. The guard has at least two damping elements for securing the guard to the support arm which extends along at least a portion of a guard length. The guard can be formed, e.g., of rubber or a plastic material. The clamping elements extend transverse to the rotational axis of the deflection roller and are pinned on both support arms. The guard can be displaced along the support arms as the departure angle of the saw cable varies between 0° and 180°.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

In the Drawings:

FIG. 1 shows a side view of a device according to the present invention for deflecting a saw cable of a cable saw;

FIG. 2 shows a bottom view of a guard shown in FIG. 1;

FIG. 3 shows a side view of the guard; and

FIG. 4 a top view of the device shown in FIG. 1 but without the saw cable.

DETAILED DESCRIPTION OF THE PREFERRED EMBODIMENT

A device according to the present for deflecting a saw cable 13 provided with diamond segments 14 and which is shown in FIGS. 1–4, includes a support 1 through which the saw cable 13 runs, and at least one deflection member 2 secured to the support with locking means 12 without a possibility of rotation relative to the support 1. The deflection member 2 has a receiving region 4 connectable with the support 1 and two, parallel to each other support arms 6. The receiving region 4 is formed as a bore pinned on a cylindrical support pin 17 of the support 1. The receiving region 4 is pivotable about the support pin 17. The deflection member 2 is fixed to the support 1 without the possibility of rotation thereto by locking means 5 that cooperates with the receiving region 4. The locking means 5 provide for reduction of the inner diameter of the bore. The deflection member 2 is axially secured on the support with a retaining ring 21 that projects in a groove formed in the support pin 17. In the embodiment shown in the drawings, there are provided two support members 2.

A deflection roller 3 is rotationally supported between the support arms 6. On its outer circumferential profile 15, the deflection roller 13 has a circumferential groove 16 the cross-section of which corresponds to that of the saw cable 13. The deflection member 2 has, in its region projecting beyond the outer profile 15 of the deflection roller 3, two adjacent to each other, guide surfaces 18 which extend transverse to the rotational axis 7 of the deflection roller 3. The two guide surfaces 18 are spaced from each other by a distance A that is larger than the cross-section of the saw cable 13 and corresponds, at most, substantially to the width of the roller 3 measured parallel to the rotational axis 7. Both guide surfaces 18 extend over 40%–50% of the circumference of the roller 3. With two deflection members 2, the guide surfaces 18 of one of the deflection members 2 are formed of replaceable, wearable elements 19 which are secured to the support arms 6, and the guide surfaces 18 of another of the deflection members 2 are formed by the two support arms 6. The wearable elements 19 can be formed, e.g., of steel, wood or plastics.

Between the deflection roller 3 and the receiving region 4 and between the guide surfaces 18, there is rotatably arranged a saw cable protective roller 8 that protects the saw cable 13 from impacts. The protective roller 8 rotates about an axis 11 that extends parallel to the rotational axis 7 of the deflection roller 3. The distance B between the protective roller 7 and the deflection roller 3, which is measured transverse to the rotational axis 7, corresponds substantially to the cross-section of the saw cable 13, 14.

The circumferential outer profile of the protective roller 8 has a circumferential indentation 20 extending over, e.g., the entire width of the protective roller 8. The greatest depth of the indentation 20 is in the middle of the protective roller 8 directly above the groove 16 of the deflection roller 3. At least the circumferential end region of the protective roller 8, where the indentation 20 is provided, is formed of a resilient material, e.g., rubber.

A section of the deflection roller 3 is covered by a guard 9 shown in FIGS. 2–3. The guard 9 has a plurality of arranged one after another, clamping elements 10 provided at both side edges of the guard 9 and pinned on both support arms 6.

Though the present invention was shown and described with references to the preferred embodiment, such is merely illustrative of the present invention and is not to be construed as a limitation thereof, and various modifications to the present invention will be apparent to those skilled in the art. It is, therefore, not intended that the present invention includes all of variations and/or alternative embodiments within the spirit and scope of the present invention as defined by the appended claims.

What is claimed is:

1. A device for deflecting a saw cable (13) of a cable saw, comprising a support (1) through which the saw cable (13) is extendable; at least one deflection member (2) securable to the support (1) without a possibility of rotation relative thereto and including a receiving region (4) connectable with the support (1) and two support arms (6) extending parallel to each other; and a deflection roller (3) rotatably supported between the two support arms (6) and having, in an outer circumferential profile (15) thereof, a circumferential groove (16) a cross-section of which corresponds to a cross-section of the saw cable (13), the deflection member (2) having, in a region thereof projecting beyond the outer profile of the deflection roller (3), facing each other and extending perpendicular to a rotational axis (7) of the deflection roller (3), guide surfaces (18) spaced from each other by a distance (A) greater than the cross-section of the saw cable (13) and corresponding to a width of the deflection roller (7) measured parallel to the rotational axis (7) thereof.

2. A device according to claim 1, wherein the guide surfaces (18) extend over from 25% to 100% of the circumference of the deflection roller (3).

3. A device according to claim 1, wherein the guide surfaces (18) are formed by replaceable wearable elements (19) securable to the support arms (6).

4. A device according to claim 1, further comprising an impact protective roller (8) for the saw cable (13) rotatably arranged between the deflection roller (3) and the receiving region (4) of the deflection member (2) and between the guide surfaces (18) and a rotational axis (11) of which extends parallel to the rotational axis (7) of the deflection roller (3).

5. A device according to claim 4, wherein a distance (B) between the deflection roller (7) and the impact protective roller (8) measured transverse to the rotational axis (7) of the deflection roller (3) substantially corresponds to the cross-section of the saw cable (13).

6. A device according to claim 4, wherein a circumferential indentation (20) is provided in the outer circumferential profile of the protective roller (8).

7. A device according to claim 4, wherein at least a circumferential end region of the impact protective roller (8) is formed of a resilient material.

8. A device according to claim 1, further comprising a guard (9) at least partially covering the circumference of the deflection roller (3).

9. A device according to claim 8, wherein the guard (9) has at least two clamping elements (10) for securing the guard to the support arms (6) which extend along at least a portion of a guard length.

* * * * *